March 24, 1970  L. E. CANCEL ETAL  3,502,480
METHOD FOR CANDYING CITRON AND OTHER FRUITS
Filed March 26, 1965
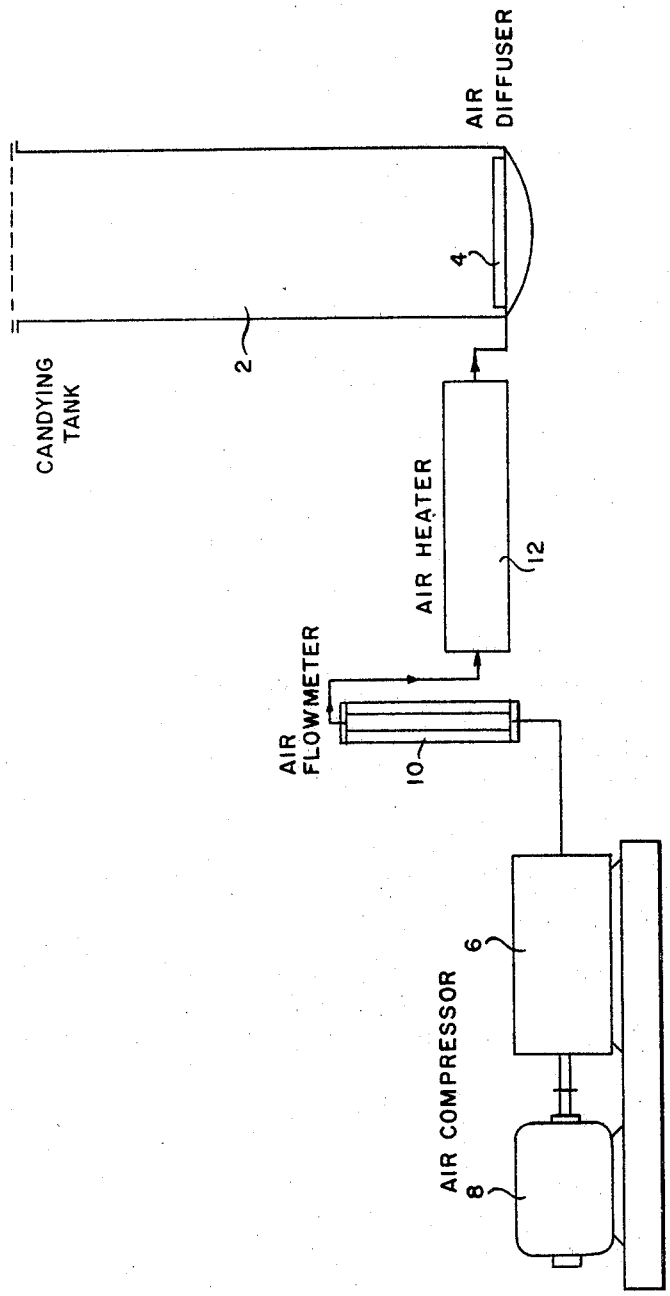
INVENTORS
LUIS E. CANCEL
RAFAEL VAZQUEZ ROMERO
ELBA DIAZ NEGRON
BY
*Scrivener Parker Scrivener & Clarke*
ATTORNEYS

3,502,480
METHOD FOR CANDYING CITRON AND OTHER FRUITS
Luis E. Cancel and Rafael Vazquez Romero, Rio Piedras, and Elba Diaz Negron, Mayaguez, Puerto Rico, assignors to The Commonwealth of Puerto Rico
Filed Mar. 26, 1965, Ser. No. 443,139
Int. Cl. A23l 1/06
U.S. Cl. 99—102                                    2 Claims

ABSTRACT OF THE DISCLOSURE

Method for candying fruit in which the fruit is immersed in a column of dilute sugar solution having a height 3 times its diameter and the concentration of the solution is progressively increased by bubbling heated air upwardly through the solution, evaporating water therefrom without reducing the volume of the solution to below the level of the fruit or adding water or sugar to the solution.

---

In general, the art of candying of fruit to which the invention generally relates consists in the heavy impregnation of the fruit by sugar or glucose, both of which will be referred to herein by the generic term "sugar." There are many known processes for accomplishing this impregnation, and among these is the traditional method in which the fruit is successively immersed in sugar solutions of increasing concentration. This may be done by successively transferring the fruit from one sugar solution to a more concentrated solution or, alternatively, the fruit may be left in one candying tank and sugar added thereto from time to time as the concentration of the candying syrup in the tank is reduced by absorption of sugar into the fruit. Other known candying processes also have the basic objective of progressively increasing the concentration of the syrup, and among these other known processes are the water bath process, the tray dehydrator process, the cascading process, the tubular evaporator process, and the vacuum concentration process. All of these are well known to those skilled in the art of candying fruit and need not be described in detail here for a complete understanding of the present invention.

This invention relates broadly to candying processes of the described general type and has had for its principal objective the provision of a new and markedly improved method of progressively increasing the sugar concentration of the candying syrup without the necessity of either physically transferring the fruit from progressively weaker to stronger syrups, or of progressively adding sugar to the candying syrup in a single tank. In contrast to these known methods, in the method according to this invention the fruit is immersed in only one syrup in only one tank and the concentration of that syrup is progressively increased without the addition of sugar thereto until the required impregnation of the fruit has been achieved. There is thus provided a continuous candying process requiring an absolute minimum of handling of either the fruit or the sugar, but which produces candied fruit of quality equal to or better than that produced by known processes but at less cost and in a shorter time. In addition, it has also been an objective of the invention to provide new and improved apparatus for candying fruit, which apparatus is operative in accordance with the method provided by the invention.

The method and apparatus provided by the invention are described in the following specification and the apparatus is illustrated in the accompanying drawing forming part of the specification.

In its broad aspect the candying method provided by the invention consists in immersing the fruit in a syrup of low sugar concentration and progressively evaporating water from the syrup by bubbling heated air (which term includes an inert gas) upwardly through the syrup-fruit mixture, thereby to progressively increase the concentration of sugar in the syrup to a final desired high concentration on the Brix scale. It will be seen that in practicing this method the fruit need not be removed from the syrup, nor from the original container for the syrup and fruit, nor is it necessary periodically to add sugar to the syrup in which the fruit is immersed, as these steps of known methods are made unnecessary by the progressive increase in the concentration of the syrup in which the fruit was originally immersed.

In carrying out the method according to the invention and having reference to the apparatus disclosed in the drawings, whole, sliced, cubed or otherwise shaped fruit is first conditioned in accordance with known practice by desalting it with successive water rinses until the desired fruit texture and salt concentration are obtained. This pre-treated fruit is then immersed in a sugar syrup of relatively low concentration, which may be in the range of 20° to 34° Brix, in a candying tank 2.

At its lower end the tank is interiorly provided with an air diffuser 4 which substantially covers the bottom of the tank and which is constructed and operable to direct air or an inert gas upwardly within the tank and the syrup and fruit therein. The diffuser 4 may be of any suitable type such as sintered carbon, glass, stainless steel or aluminum oxide. The tank is of substantial height with respect to its lateral area so that the height of the column of syrup therein will be about three times its diameter in order to cause efficient and economical use of the air for evaporation purposes.

Air is supplied to the diffuser 4 by a motor-compressor unit 6 which delivers air under suitable pressure to a flow meter 8, thence to an air heater 10, and thence to the diffuser 4. The motor-compressor unit is of the type which produces a large volume of air at low pressure, and the flow meter 10 may be adjusted to regulate the volume of air delivered to the heater 10 and diffuser 4 so that air will be bubbled upwardly through the syrup at a rate of about 10 cubic feet per minute. The heating device 10 may be of any suitable type but is preferably an electrical resistance or steam type heater as such heaters add no odor to the air.

The candying process provided by the invention starts with the introduction into tank 2 of a sugar solution, preferably having a low sugar concentration in the range of 20°–34° Brix, until the height of the syrup column in the tank is about three times its diameter. The fruit to be candied is then completely immersed in the syrup. Compressed air is then supplied through the heater 10 to the diffuser 4, and the heater is adjusted so that air is supplied to the diffuser at a temperature of approximately 260° F. which will keep the syrup in the tank at a temperature of approximately 90° F. The diffuser is so constructed and is of such lateral dimensions that it causes the heated air to rise through the syrup in minute bubbles over substantially the entire lateral area of the tank and the candying solution so that the water in the syrup is constantly evaporated or carried away by the air bubbles escaping at the surface of the syrup column, thus progressively increasing the sugar concentration of the syrup. Such increase in concentration is required in the candying operation, and in accordance with the invention is produced entirely by evaporation or removal of water from the syrup by the upward passage of the stream of minute bubbles of heated air. The entire candying operation is therefore carried out in the single tank and in a single syrup, without the necessity of moving the fruit from tank to tank and without the necessity of adding additional sugar to the syrup in the tank.

The process of upward bubbling of air with its resulting evaporation or removal of water is continued for a sufficient time to produce a solution having a desired high sugar concentration, and the following table shows the results of operation in a number of trials:

| Experiment No. | Initial Brix of Candying Syrup (deg.) | Lbs. of Diced Citron | Brix of Syrup in 72 Hours (deg.) | Remarks |
|---|---|---|---|---|
| 1 | 34 | 6 | 70 | |
| 2 | 32 | 6 | 72 | |
| 3 | 33 | 6 | 75 | |
| 4 | 35 | 6 | 68 | Air flow went down during operation. |
| 5 | 32 | 6 | 76 | |

While we have described and illustrated certain steps of the method provided by the invention, and certain apparatus for carrying out the method, it will be understood by those skilled in the arts to which the invention relates that other steps and apparatus, as well as modifications of those disclosed, may be made and practiced without departing in any way from the spirit or scope of the invention, for the limits of which reference must be made to the appended claims.

What is claimed is:

1. A process for candying fruit, comprising the steps of immersing the fruit in a column of aqueous sugar solution of low concentration, said solution column having a height of about 3 times its diameter and, without removing the fruit therefrom or adding sugar thereto, continuously diffusing minute bubbles of heated air or an inert gas upwardly throughout the solution to the surface thereof to thereby remove water from the solution and increase the concentration thereof.

2. The process according to claim 1, in which the air is heated to approximately 260° F. and the solution is maintained at approximately 90° F. by the heated air.

References Cited

UNITED STATES PATENTS 2,785,071  3/1957  Mathews _____ 99—102

FOREIGN PATENTS 117,093  6/1943  Australia.

A. LOUIS MONACELL, Primary Examiner

J. H. HUNTER, Assistant Examiner